United States Patent [19]

Johnston, Jr. et al.

[11] Patent Number: 5,880,729
[45] Date of Patent: Mar. 9, 1999

[54] GRAPHICAL USER INTERFACES HAVING ANIMATED CONTROL ELEMENTS

[75] Inventors: Robert G. Johnston, Jr., Gainesville, Fla.; Elizabeth Robinson Moller, Boulder Creek; Robert Ulrich, Mountain View, both of Calif.

[73] Assignee: Apple Computer, Inc., Cupertino, Calif.

[21] Appl. No.: 435,387

[22] Filed: May 5, 1995

Related U.S. Application Data

[63] Continuation-in-part of Ser. No. 243,327, May 16, 1994, and a continuation-in-part of Ser. No. 243,268, May 16, 1994, and a continuation-in-part of Ser. No. 242,963, May 16, 1994.

[51] Int. Cl.$^6$ ............................................. G06F 3/14
[52] U.S. Cl. ........................ 345/348; 345/354; 345/977
[58] Field of Search ........................ 395/155, 156, 395/157, 159, 161, 152, 154, 339, 348, 354, 977, 334, 335, 326, 972; 345/339, 348, 354, 977, 334, 335, 326, 972

[56] References Cited

U.S. PATENT DOCUMENTS

| 5,202,961 | 4/1993 | Mills et al. ........................... 395/159 |
| 5,347,628 | 9/1994 | Brewer et al. ....................... 395/351 |
| 5,353,391 | 10/1994 | Cohen et al. ..................... 395/161 X |
| 5,359,712 | 10/1994 | Cohen et al. ....................... 395/161 |
| 5,428,730 | 6/1995 | Baker et al. ..................... 395/161 X |
| 5,479,602 | 12/1995 | Baecker et al. ..................... 395/349 |
| 5,524,195 | 6/1996 | Clanton, III et al. ................. 395/327 |
| 5,544,295 | 8/1996 | Capps ................................. 395/173 |
| 5,767,835 | 6/1998 | Obbink et al. ....................... 345/146 |

FOREIGN PATENT DOCUMENTS 650114  4/1995  European Pat. Off. .

OTHER PUBLICATIONS

*Working in the Third Dimension,* Jamie OSBORNE et al. pp. 103–114, Sep. 1993.
PCT Written Opinion, Date of Mailing: *19 Jun. 1996*.
PCT International Search Report Date of Mailing: 11 Sep. 1995.
D. G. Johnston, "Programming the Graphical User Interface Extensions of MMPM/2", OS/2 DEVELOPER, vol. 5, No. 4, pp. 80–85 (Sep. 1993).
IBM TECHNICAL DISCLOSURE BULLETIN, "OS/2: *Contextual Animated–Open Window Control*", vol. 34, No. 11, pp. 68–69 (Apr. 1992).

*Primary Examiner*—Matthew M. Kim
*Assistant Examiner*—Crescelle N. dela Torre
*Attorney, Agent, or Firm*—Burns, Doane, Swecker & Mathis, L.L.P.

[57] ABSTRACT

Systems and methods for providing an enhanced visual appearance to a graphical user interface are described. Control elements portrayed by the graphical user interface on a display are associated with at least two states. When transitioning between states, an animated transition effect can be provided to provide further user or designer customization of the interface appearance.

9 Claims, 10 Drawing Sheets

|  | TO | | | | | | | | |
|---|---|---|---|---|---|---|---|---|---|
| FROM | Q1 | Q2 | Q3 | Q4 | Q5 | Q6 | Q7 | Q8 | Q9 |
| Q1 |  | T1 | T3 | T5 |  |  | T7 |  |  |
| Q2 | T2 |  |  |  |  |  |  |  |  |
| Q3 | T4 |  |  |  |  |  |  |  |  |
| Q4 | T6 |  |  |  | T9 | T11 | T13 |  |  |
| Q5 |  |  |  | T10 |  |  |  |  |  |
| Q6 |  |  |  | T12 |  |  |  |  |  |
| Q7 | T8 |  |  | T14 |  |  |  | T15 | T17 |
| Q8 |  |  |  |  |  |  | T16 |  |  |
| Q9 |  |  |  |  |  |  | T18 |  |  |

GRAPHICAL USER INTERFACES HAVING ANIMATED CONTROL ELEMENTS

RELATED APPLICATIONS

This application is a continuation-in-part of U.S. patent application Ser. No. 08/243,327 entitled "A System and Method for Customizing Appearance and Behavior of Graphical User Interfaces" and a continuation-in-part of U.S. patent application Ser. No. 08/243,268 entitled "Switching Between Appearance/Behavior Themes in Graphical User Interfaces," and a continuation-in-part of U.S. patent application Ser. No. 08/242,963 entitled "Pattern and Color Abstraction in a Graphical User Interface," each of which was filed on May 16, 1994 and each of which is incorporated here by reference.

BACKGROUND

The present invention relates generally to graphical user interfaces for computer systems. More particularly, the present invention relates to systems and methods for interfacing applications and operating systems which provide for animated control elements in graphical user interfaces.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly," "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

Figure 1:
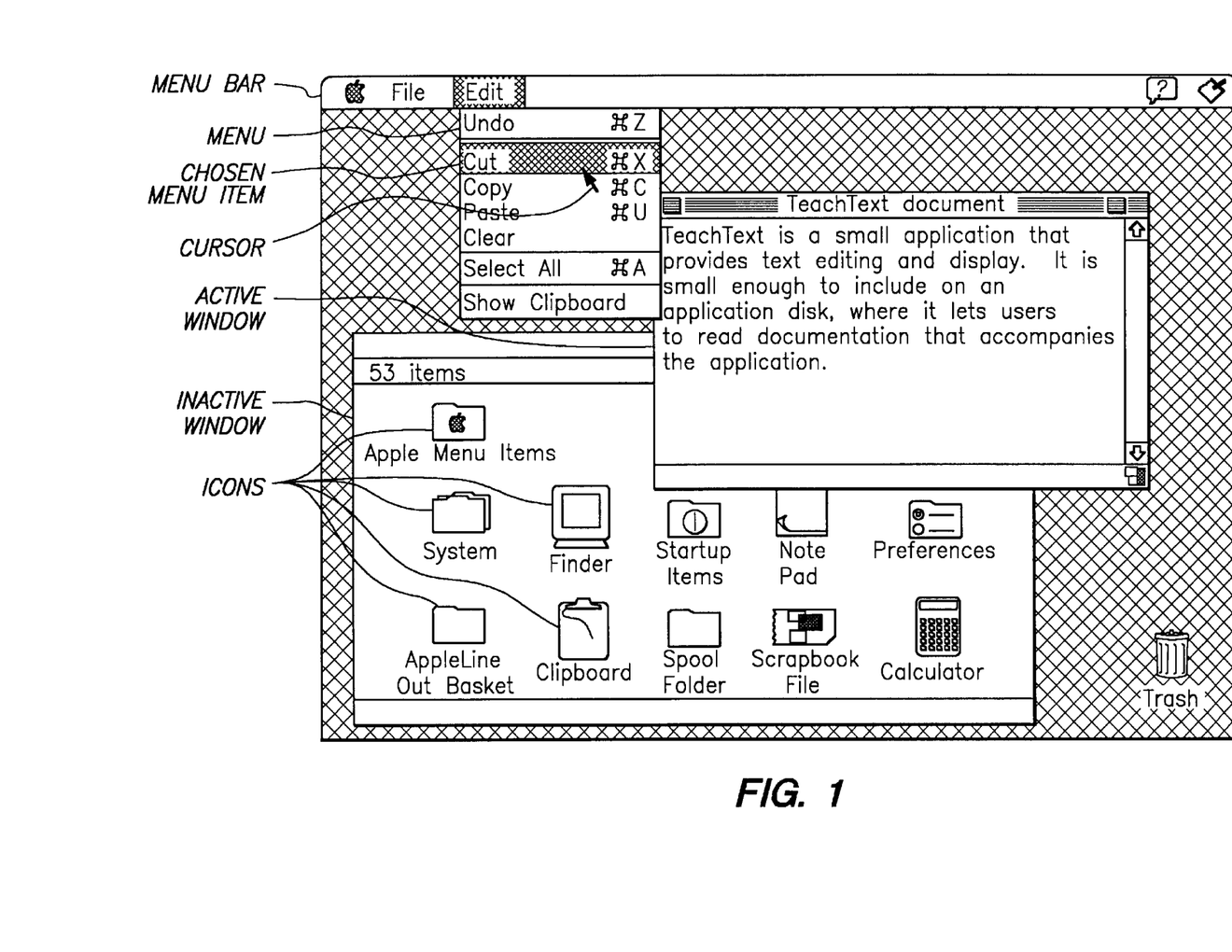
FIG. 1 shows a conventional desktop screen.

One type of GUI display is based on a visual metaphor which uses a monitor screen as a work surface called a "desktop" where documents are presented in relocatable regions termed "windows". The user interacts with the computer by, for example, moving objects on the desktop, choosing commands from menus, and manipulating window control elements, such as checkboxes and scroll bars. An exemplary desktop screen is reproduced as FIG. 1.

Figure 2:
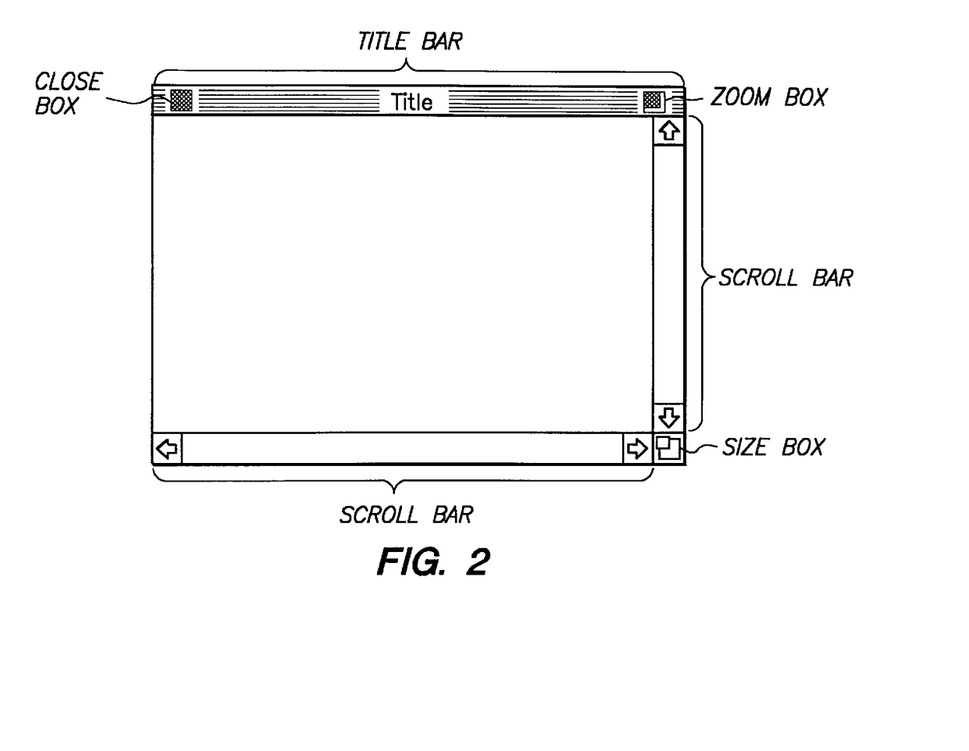
FIG. 2 shows a conventional document window.

Windows are one example of desktop objects which can be virtually any size, shape, or color. Some standard types of windows are commonly predefined for the interface including, for example, a document window and a dialog box. One example of a standard for a document window is illustrated in FIG. 2. Each document window which conforms to this standard has a title bar with a title drawn in a system-defined font and color. Active document windows can also have control elements as illustrated in FIG. 2, for example, a close box, a zoom box, a size box, and scroll bars. Other control elements, not shown in FIG. 2, include buttons, menu items and checkboxes. Those skilled in the art will recognize that myriad other control elements are known and in use.

Figure 3:
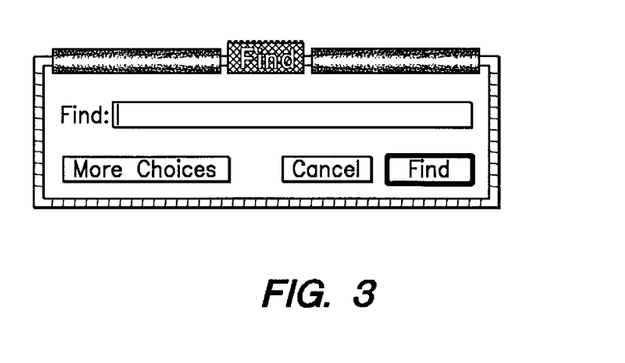
FIG. 3 illustrates an exemplary window having button control elements.

Control elements are on screen objects that a user can manipulate with, for example, a mouse to cause an immediate action or modify settings to cause a future action. For example, a button control element can provided for the graphical user interface to receive user input as to a selected function to be performed by the system. FIG. 3 illustrates a window entitled "Find" having three button control elements whose titles describe the function to be performed when these control elements are activated. A user can activate a button control element in a variety of ways, for example by positioning a cursor (not shown in FIG. 3) over the control element and providing an activating input, e.g., depressing a mouse button.

As shown in FIG. 3, control elements are typically displayed in a static default or normal state. However, when a button control element is actuated the graphical user interface redraws the control element in a second static state which visually informs the user that the system has recognized the user's input and is performing the desired function. For example, some conventional graphical user interfaces redraw button control elements in a depressed state to indicate activation.

The success of these types of conventional interfaces is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of applications. With these new resources at their disposal, application designers, and others, desire additional control over the appearance of the display, including the desktop environment and, in particular, objects and control elements on the desktop.

SUMMARY

According to exemplary embodiments of the present invention, an improved visual appearance can be provided to GUIs by providing transitional visual effects between static states for control elements. For example, an animated effect can be created by repeatedly redrawing the control element using stored transitional images after a control element has been actuated by a user. These transitional effects allow designers to create, and users to customize, a more interesting system interface.

BRIEF DESCRIPTION OF THE DRAWINGS

The foregoing, and other, objects, features and advantages of the present invention will be more readily understood by those skilled in the art upon reading the following detailed description in conjunction with the drawings in which.

DETAILED DESCRIPTION

The present invention is described herein by way of exemplary, illustrative embodiments, some of which use the Macintosh® computer system and visual displays created thereby as a reference for explaining the present invention. Those desiring additional information with respect to the Macintosh® system are referred to Inside Macintosh, Vols. 1–6. Of course, those skilled in the art will readily appreciate that systems and methods according to the present invention can be applied to any type of display system having a user interface. Further, certain exemplary control elements are used to describe concepts according to the present invention, it will be understood that the present invention is applicable to any type of control element.

Figure 4A:
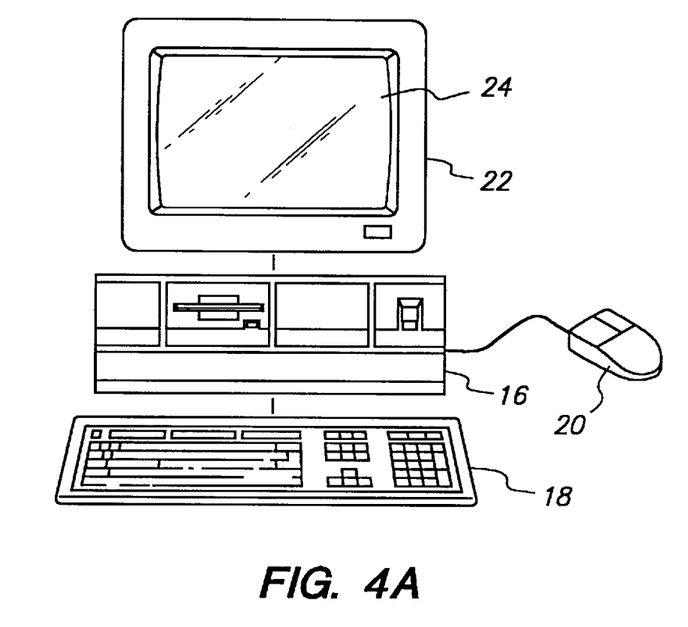
FIG. 4(a) illustrates an exemplary computer system which can be used in conjunction with the present invention.
Figure 4B:
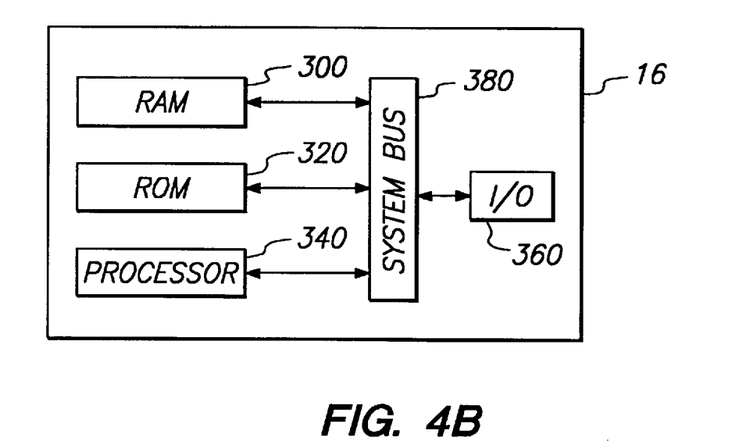
FIG. 4(b) is a block diagram illustrating various exemplary functional units of the computer system of FIG. 4(a)

Graphical user interfaces according to the present invention can, for example, be used in conjunction with a computer such as that illustrated in FIG. 4. Therein, a personal computer is illustrated as having a box 16 which contains, among other elements, circuit boards associated with the computer's functions including memory devices and one or more processors, a keyboard 18, a pointing device 20 and a monitor 22 having a display space 24. Of course the personal computer illustrated in FIG. 4(a) is purely exemplary of one type of computer system in which graphical user interfaces according to the present invention may be implemented. For example, although the display space 24 of the system depicted in FIG. 4(a) consists of that provided by monitor 22, those skilled in the art will recognize that additional display devices could be arranged proximate monitor 22 to create a display space bridging several monitors. The circuit boards included in box 16 can include boards which accommodate functional units such as those illustrated by the block diagram of FIG. 4(b). Therein RAM 300, ROM 320, processor 340, and I/O 360 are all interconnected via system bus 380.

Figure 5:
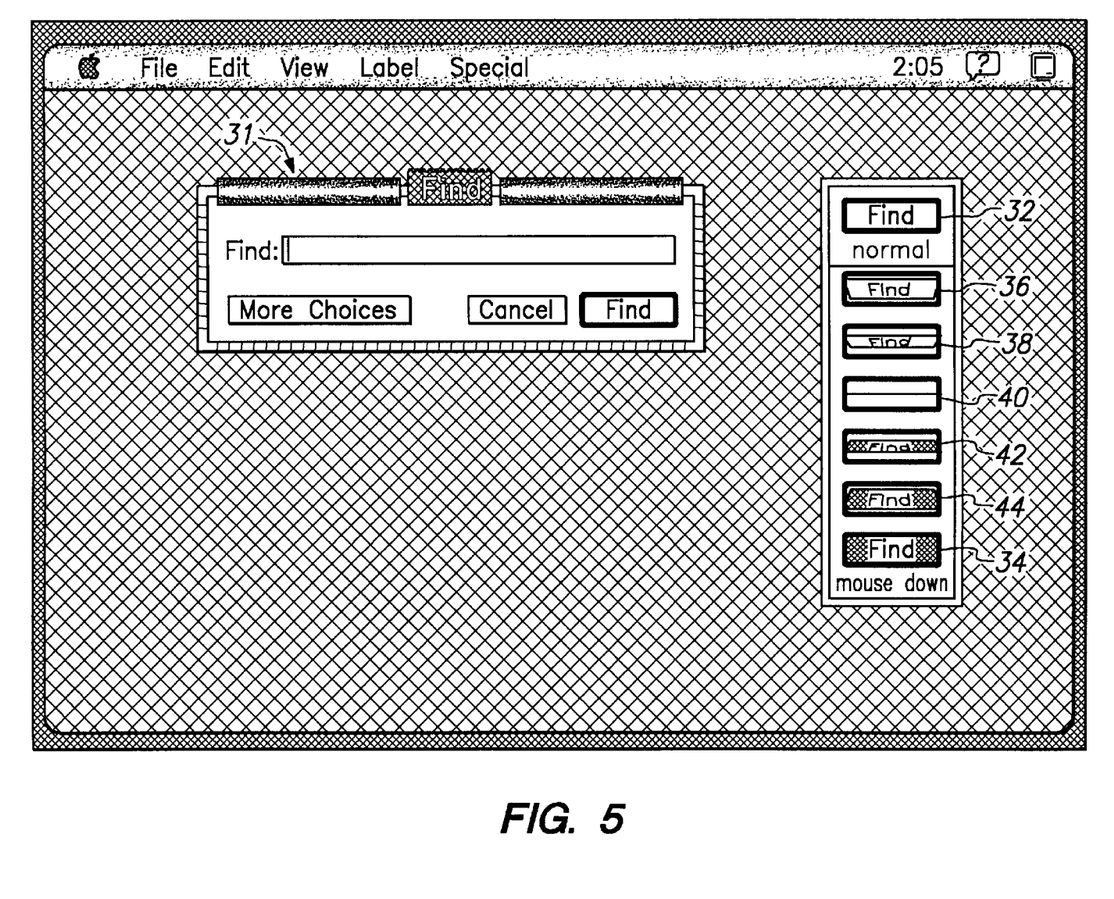
FIG. 5 illustrates an exemplary desktop window and a set of transition images which can be used to provide an animated transition effect for a control element according to an exemplary embodiment of the present invention.

According to exemplary embodiments of the present invention, animated transitions between control element display states are provided. FIG. 5 provides an example of this concept based on the earlier described button control element of FIG. 3. Therein, the same window entitled "Find" is displayed by a graphical user interface on a display 30. To the right of the "Find" window 31 in FIG. 5 is a rectangle which contains exemplary display states for the "Find" button control element in the "Find" window of FIG. 5. For example, a first static display state 32 is shown which corresponds to the default or "normal" display state of the "Find" button before a user activates the button. After the user activates the "Find" button, e.g., by positioning a cursor over this button and depressing a mouse button, the user interface enters a routine for providing a transition effect on the display 30. In the example shown in FIG. 5, the transition effect is an animated sequence which gives the visual impression of flipping the "Find" button around an axis extending through the center of the button lengthwise to replace the default display state 32 with the second display state 34. In the example of FIG. 5, the default display state 32 has a different background and lettering color than the second display state 34.

The transition effect is created by retrieving a sequence of transition images from a memory device (not shown) of computer system 16 and repeatedly redrawing the "Find" button using each of these images. These transition images can, for example, be stored as bit-mapped images in the memory device. In FIG. 5, the transition images 36, 38, 40, 42 and 44 have been depicted in display order from top to bottom in the rectangle. Note that transition images 36 and 38 depict the "Find" button using the same background and lettering colors as the default state 32 while transition images 42 and 44 depict the "Find" button using the same background and lettering colors as the second static display state 34.

Figure 6:
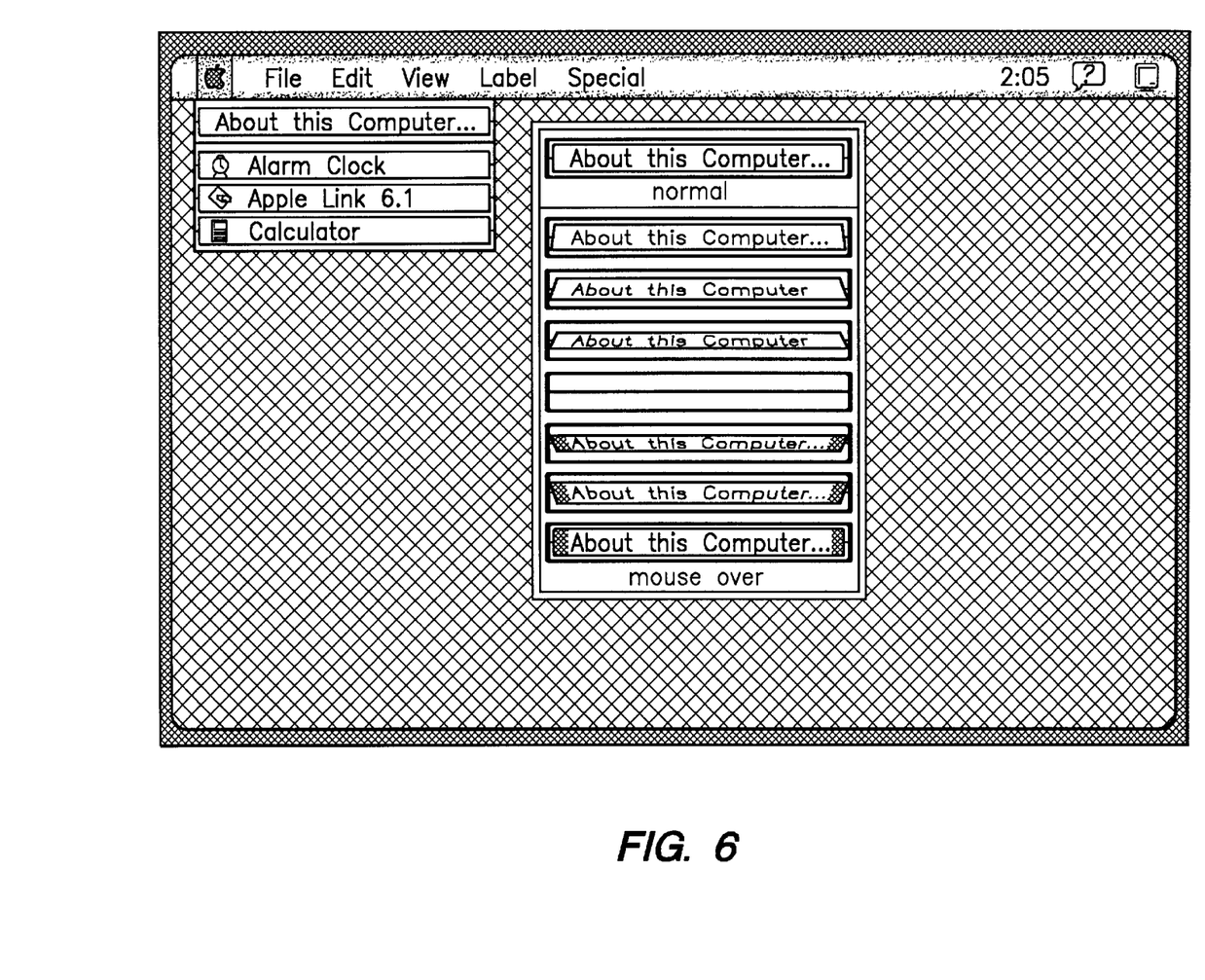
FIG. 6 illustrates another exemplary desktop window and a set of transition images which can be used to provide an animated transition effect for a control element according to another exemplary embodiment of the present invention.

Another example of animated control element transition is shown in FIG. 6. In this example, the control element is a menu item entitled "About this Computer". Like the example of FIG. 5, the animated transition effect is a revolution of the menu item about a central axis to reveal the menu item drawn in a different background and lettering color. Unlike the example of FIG. 5, however, the transition shown in FIG. 6 occurs in response to the user's moving the cursor over the control element rather than in response to an activation of the control element. This illustrates that the present invention is applicable to any state change of control elements in which a corresponding visual change is desirable. Also note that the number of transition images provided between static display states can be variable depending upon the animated effect desired, e.g., five in FIG. 5 and six in FIG. 6.

State tables can be also be used to store information identifying the static display state images and the transitional effects between states that are associated with particular triggering actions. Although exemplary embodiments of the present invention focus on animated transitions, each transition may contain one or more of, for example, an animation sequence, a sound or a routine to implement a custom transition, e.g., an algorithmic display or any other type of transitional effect. An exemplary state diagram table is shown as FIG. 7 which provides an example of possible states and common state transitions for a checkbox control element of a window. This state diagram can then be reduced to a state table as shown in FIG. 8.

Figure 7:
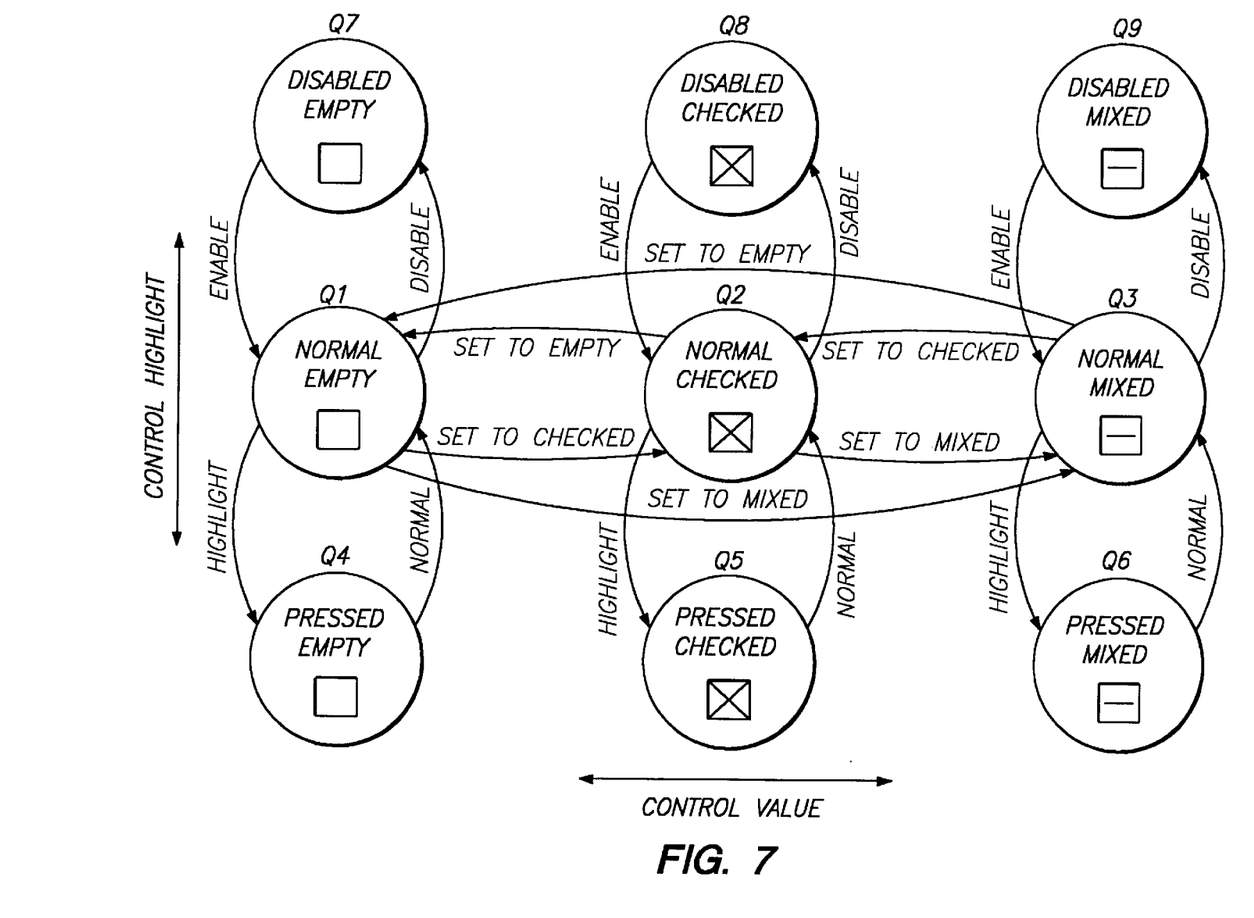
FIG. 7 is a state diagram used to illustrate transitions of a control element according to an exemplary embodiment of the present invention.
Figure 8:
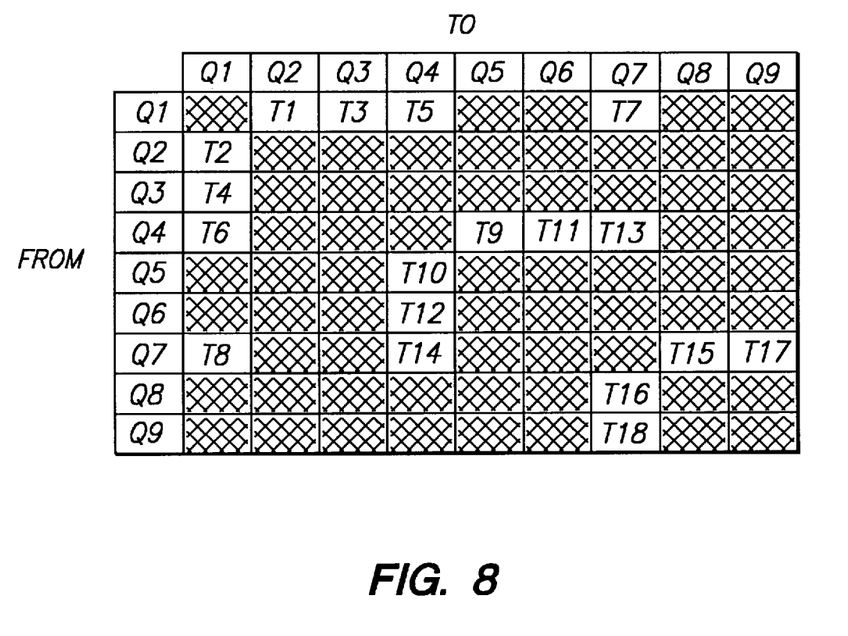
FIG. 8 is an exemplary matrix used to describe control element transitions according to an exemplary embodiment of the present invention.

As seen in FIGS. 7 and 8, this exemplary checkbox control element has nine possible states which can be displayed. These states include three highlighted display states for each of the control element's three values. For example, when a user, clicks on an unchecked checkbox (state Q1) using a mouse button, this action moves the control to its pressed state (state Q4). After the mouse button is released, the control returns back to its original state (state Q1) and the application is notified of the button which has been pressed. The application then switches the value of the control to its new value, which might be checked (state Q2). FIG. 8 is a matrix of all of the possible transitions between states Q1 and Q9. Transition effects are indicated for some of these transitions by the notations T1–T18 found in some of the matrix locations. For example, transition effect T1 occurs when an empty checkbox (state Q1) becomes checked (state Q2). This effect could be, for example, a repeated redrawing of the checkbox wherein sequentially greater portions of the "X" in the second static display state appear to provide an animated drawing effect of the "X". Note that not all of the state transitions are required to have transition effects as underscored by the empty matrix locations in FIG. 8.

Figure 9A:
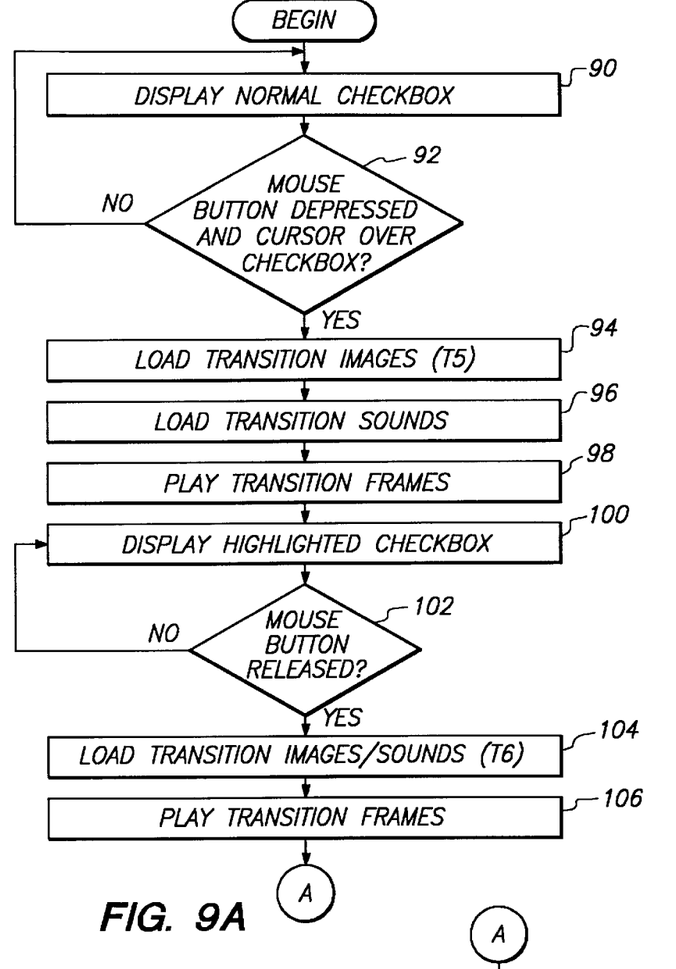
FIG. 9(a) is a flowchart used to describe an exemplary process for providing transitions between control element display states according to an exemplary embodiment of the present invention.
Figure 9B:
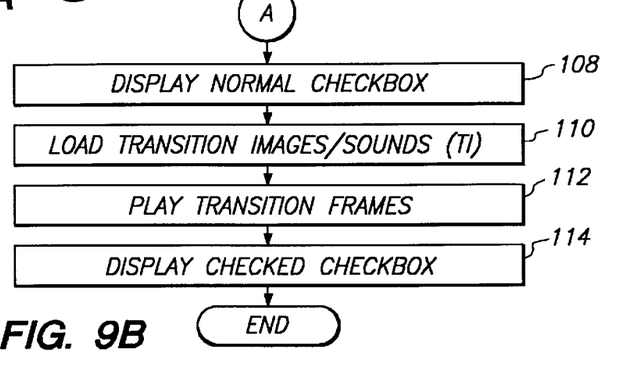
FIG. 9(b) is a continuation of the flowchart of FIG. 9(a)

A discussion of an exemplary technique by which the foregoing concepts can be combined to provide transitional effects will now be described using the flow chart of FIGS. 9(a) and 9(b). FIG. 9(a) depicts an exemplary process whereby transitional effects are created between static states of a checkbox in response to interactions between a user and a graphical interface according to an exemplary embodiment of the present invention. First, the checkbox is displayed in its normal state at block 90. This state corresponds to state Q1 in FIGS. 7 and 8. Next, the system periodically ascertains whether or not a mouse button is pressed by a user when the cursor is positioned over the checkbox at block 92. Until this occurs, the normal checkbox continues to be displayed. It will be appreciated that the flow chart of FIG. 9(a) and 9(b) is a simplification of the state diagram of FIG. 7 which provides for other state transitions from the normal checkbox state Q1 than the transition to Q4 mentioned here. After a user has performed the actions identified in block 92 for selecting a checkbox, then the flow proceeds to block 94 where the transition images are loaded for the particular transitional effect to be displayed by the graphical user interface when a user selects a checkbox. Those skilled in the art will appreciate that transitional images can, for example, be stored in memory (e.g., as bit mapped images) or created dynamically depending upon the nature of the control element. In this example, the selected checkbox will reach a static state which is highlighted in a manner that provides a visual appearance that the checkbox has been raised from its normal state. Thus, the transition images could be used to generate frames which, when displayed, give the checkbox the appearance of moving upward relative to the other elements on the graphical user interface.

At the same time, transition sounds (if any) can be loaded at block 96 and subsequently the transition images and transition sounds can be played together in frames at block 98 to achieve the desired transitional effect. Once this transitional effect has culminated, the checkbox will then be displayed in its next static state (i.e., state Q4 in FIGS. 7 and 8) at block 100.

Figure 10:
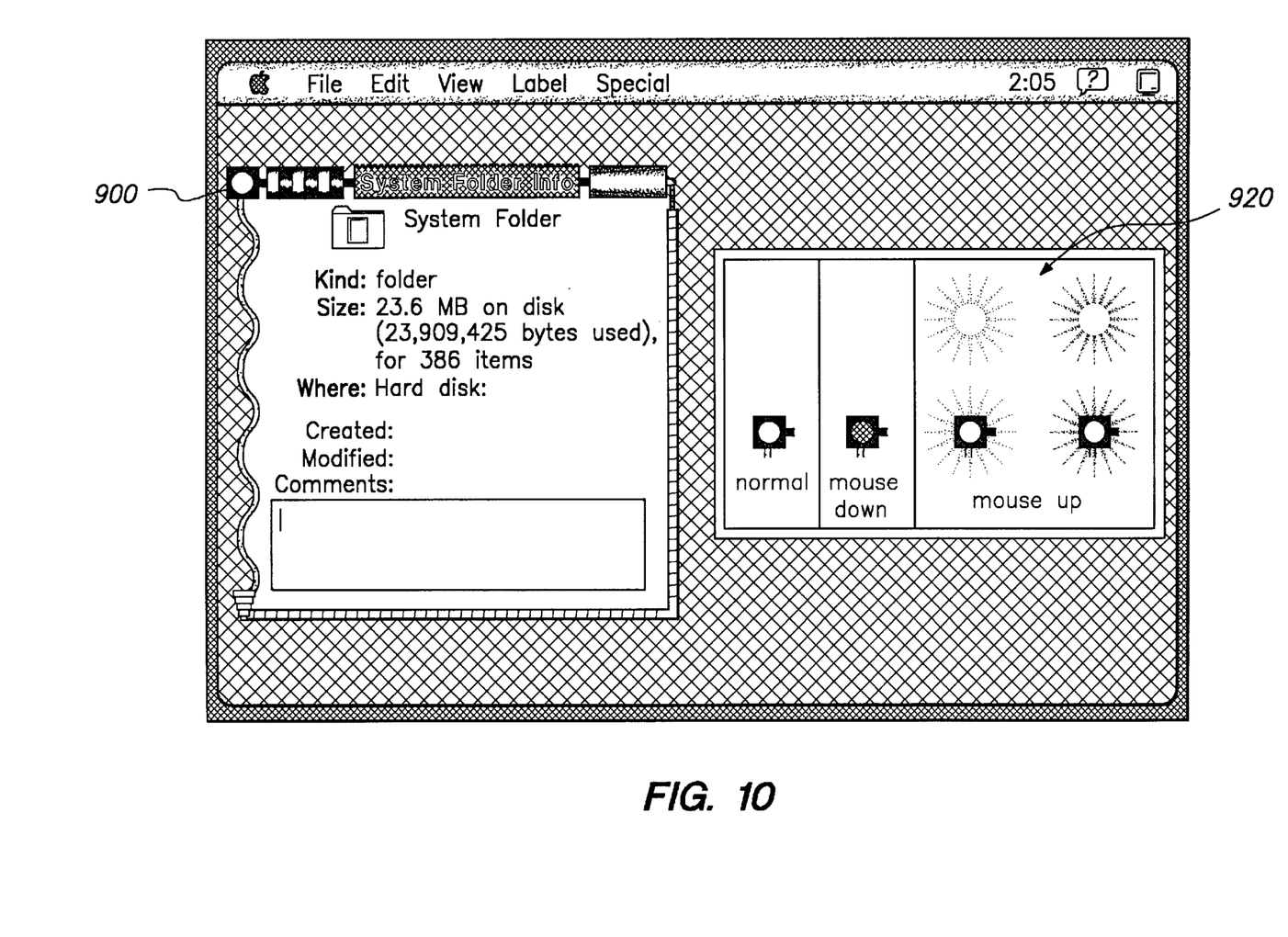
FIG. 10 illustrates another exemplary desktop window and a set of transition images which can be used to provide an animated transition effect for a control element according to another exemplary embodiment of the present invention.

Until the user releases the mouse button, the graphical user interface continues to display the checkbox in its highlighted state at block 100. However, after the user releases the mouse button, thereby indicating a desire that the selected checkbox be checked, the flow then proceeds to block 104. Referring to FIGS. 7 and 8, it can be seen that the transition between a highlighted checkbox and a checkbox in its checked state (Q2) first requires a transition back to the normal checkbox state (Q1). Thus, the system will refer to the state table of FIG. 8 and load the transitional images and/or sounds associated with transition T6 at block 104. These loaded transition images and sounds are then used by the system to generate the next set of transition frames which are played at block 106 to create the transitional effect T6, for example, giving the visual impression that the checkbox is lowered into the normal checkbox state. Referring now to FIG. 9(b), once the transition frames used to generate the transitional effect T6 have ended, the graphical user interface then displays the checkbox in its normal state at block 108. Since this is only an intermediate state between the highlighted state Q4 and the checked state Q2, the flow then proceeds to block 110 where the next set of transition images and/or sounds is loaded to prepare for the implementation of transitional effect T1. The transitional frames for effect T1 are played at block 112 leading to the display of the checked checkbox by the graphical user interface at block 114. The foregoing provides one example of the interaction between the system, the graphical user interface and the state tables/diagrams, all of which cooperate to provide transitional effects for control elements between static states thereof according to exemplary embodiments of the present invention. Many other types of animated transition effects between states of control elements are also possible by way of the present invention. For example, FIG. 10 depicts a "System Folder Info" window having a close box control element 900. When activated to close the window, close box control element 900 may be redrawn at the same position of the display using a sequence of transition images stored in memory, such as the four images shown in rectangle 920. This sequence of transition images might give a user a visual impression that the checkbox was exploding and disappearing just prior to the "System Folder Info" window being closed.

Figure 11:
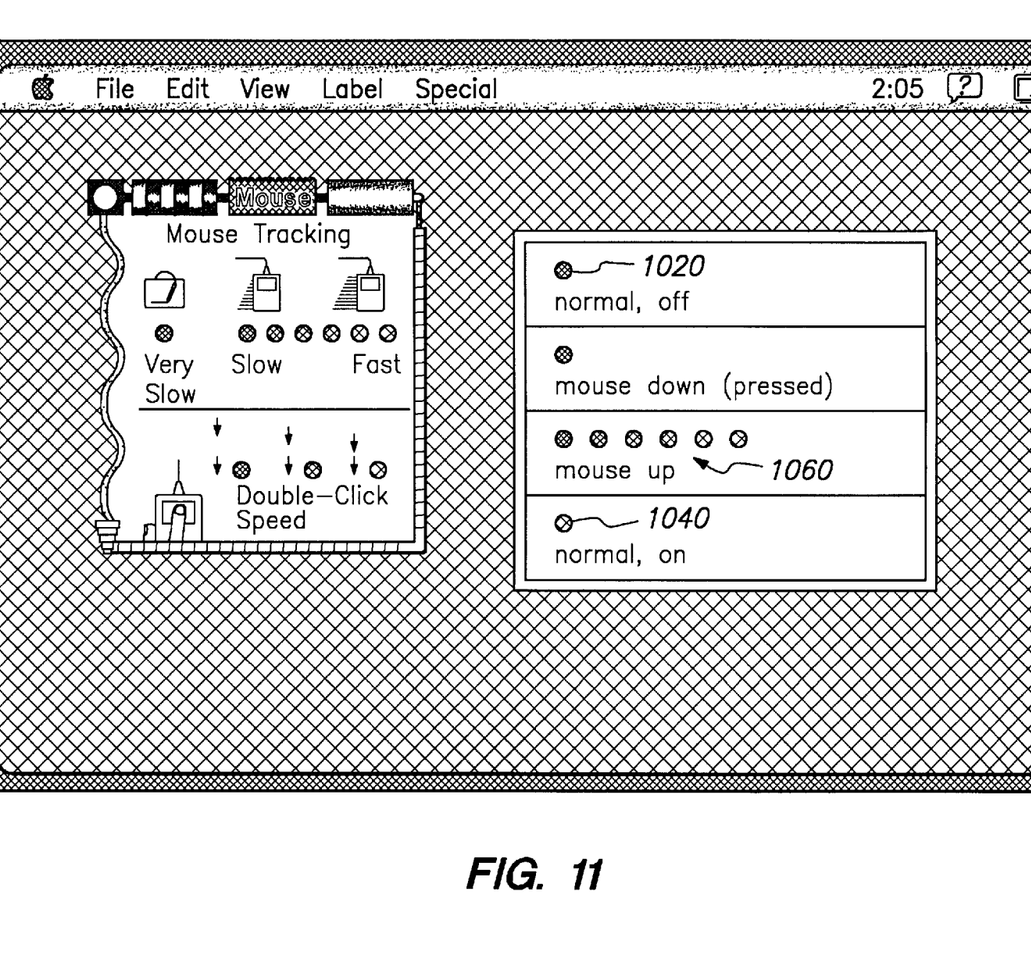
FIG. 11 illustrates another exemplary desktop window and a set of transition images which can be used to provide an animated transition effect for a control element according to another exemplary embodiment of the present invention.

Another example is shown in FIG. 11 which portrays a window entitled "Mouse" having a plurality of indicator buttons 1000. Although difficult to discern in the gray scale depiction of FIG. 11, the sixth indicator button 1000 from the left is currently selected as shown by a filled-in (e.g., with a different color in the displayed version) center portion of the indicator button. When a user wishes to change the speed of the mouse tracking, the user positions the cursor over the appropriate indicator button 1000 and, for example, depresses and then releases one of the mouse buttons. According to this exemplary embodiment, an animated change from the default static state 1020 to the "on" static state 1040 is provided by redrawing the selected indicator button using, for example, the five transition images 1060 when the mouse button is released. This provides the visual appearance to the user that the center portion of the selected indicator button gradually fills in until it reaches the static state 1040.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for providing an animated transition effect between a first display state associated with a first functional state of a control element drawn on a graphical user interface of a computer system and a second display state associated with a second functional state of said control element, the method comprising:

drawing said control element in said first display state at a first portion of a display space controlled by said graphical user interface;

receiving, at said graphical user interface, a user input invoking said second functional state of said control element;

evaluating a state table associated with said control element having table entries, each of which is associated with a transition between different combinations of states, to identify a table entry associated with a transition between said first display state and said second display state;

retrieving a sequence of transition images of said control element stored in a memory device, based on the table entry identified, wherein each of said transition images in said sequence provides a portion of a visual effect which creates a transition between said first display state and said second display state;

repeatedly redrawing said control element at said first portion of said display space using said sequence of transition images; and drawing, after a last of said transition images in said sequence, said control element in said second display state at said first portion of said display space.

2. The method of claim 1, further comprising the step of:

providing, as said control element, a button.

3. The method of claim 2, wherein said step of drawing said control element in said first state further comprises the step of:

drawing said button having a first background color and a first lettering color.

4. The method of claim 3, wherein said step of receiving, at said graphical user interface, a user input invoking said second functional state of said control element further comprises the step of:

receiving a signal indicating that said button has been pressed.

5. The method of claim 4, wherein said step of retrieving a sequence of transition images further comprises the step of:

retrieving, as said sequence of transition images, versions of said button rotating about an axis, wherein at least one of said versions depicts said button using said first background color and said first lettering color and at least one of said versions depicts said button using a second background color and a second lettering color.

6. The method of claim 5, wherein said step of drawing said control element in said second display state further comprises the step of:

drawing said button using said second background color and said second lettering color.

7. In a computer having a display, a system for providing an animated transition effect between a first and a second display state of a control element on said display, said system comprising:

an input device for controlling movement of a cursor on said display and for generating a user-controlled output when said cursor is positioned over said control element;

a graphical user interface for rendering said control element on said display in said first display state, for receiving said user-controlled output, and for identifying a state transition between said first display state and said second display state in a state table whose entries are associated with a transition between different combinations of states; and a storage device for storing transition images associated with said control element, wherein when said graphical user interface receives said user-controlled output, and repeatedly redraws said control element using said transition images based upon a state transition identified.

8. A graphical user interface comprising:

at least one control element having a first static display state and a second static display state;

means for evaluating a state table associated with said control element, which state table contains a plurality of table entries each of which is associated with a different combination of display state transitions, to identify a table entry associated with a state transition between said first static display state and a second static display state; and means for retrieving a series of transitional images and displaying those transitional images in a timed sequence between said first and second static display states based upon the table entry identified.

9. A method for displaying a transitional effect between static states of a control element comprising the steps of:

displaying said control element in a first static state;

receiving a user input associated with a transition to a second static state;

identifying a transitional effect associated with said transition using a state table, which state table is associated with said control element and has table entries which are associated with different combinations of display state transitions, to identify a table entry associated with a transition between said first display state and said second display state;

displaying said transitional effect pursuant to a transitional effect identified; and rendering said control element in a second static state after said transitional effect has been displayed.

* * * * *